US011828265B2

(12) United States Patent
Rabaut et al.

(10) Patent No.: US 11,828,265 B2
(45) Date of Patent: Nov. 28, 2023

(54) COUPLING TOOL FOR CONNECTION TO AN OUTER END OF A TUBULAR ELEMENT FOR UPENDING THE ELEMENT

(71) Applicant: DEME Offshore BE NV, Zwijndrecht (BE)

(72) Inventors: Dieter Wim Jan Rabaut, Ghent (BE); Kenneth Gerard Vannieuwenhuyse, Sint-Amandsberg (BE); Jan Maria Koen Michielsen, Antwerp (BE)

(73) Assignee: DEME Offshore BE NV, Zwijndrecht (BE)

( * ) Notice: Subject to any disclaimer, the term of this patent is extended or adjusted under 35 U.S.C. 154(b) by 172 days.

(21) Appl. No.: 17/262,812

(22) PCT Filed: Jul. 22, 2019

(86) PCT No.: PCT/EP2019/069674
§ 371 (c)(1),
(2) Date: Jan. 25, 2021

(87) PCT Pub. No.: WO2020/020821
PCT Pub. Date: Jan. 30, 2020

(65) Prior Publication Data
US 2021/0310465 A1  Oct. 7, 2021

(30) Foreign Application Priority Data
Jul. 26, 2018 (BE) .................................. 2018/5540

(51) Int. Cl.
*B66C 1/10* (2006.01)
*B66C 1/42* (2006.01)
(Continued)

(52) U.S. Cl.
CPC .............. *F03D 13/25* (2016.05); *B66C 1/108* (2013.01); *B66C 1/427* (2013.01); *B66C 13/08* (2013.01); *F03D 13/10* (2016.05); *F05B 2230/61* (2013.01)

(58) Field of Classification Search
CPC ......... F03D 13/25; F03D 13/10; B66C 1/427; B66C 13/08; B66C 1/108
(Continued)

(56) References Cited

U.S. PATENT DOCUMENTS 3,680,907 A * 8/1972 Siegwart ................. B66C 1/485
                                                                                           414/626
4,705,314 A * 11/1987 Moore .................. E21B 33/076
                                                                                           294/86.15
(Continued)

FOREIGN PATENT DOCUMENTS

DE    1248887 B    8/1967
GB    2429966 A    3/2007
(Continued)

*Primary Examiner* — Paul T Chin
(74) *Attorney, Agent, or Firm* — THE WEBB LAW FIRM

(57) ABSTRACT

A coupling tool for connection to an outer end of a tubular element for the purpose of upending the element has an engaging mechanism with which the outer end of the element can be engaged, and a pivotable lifting member with which the coupling tool can be suspended from a lifting device such as a crane. Resilient arms are further mounted on the coupling tool, which arms can be moved from a starting position to a position against a wall part of the outer end of the element for the purpose of aligning the suspended coupling tool relative to the outer end, and for damping movements of the suspended coupling tool. Also described herein is a device which utilizes the coupling tool, and a method which makes use of the device.

20 Claims, 5 Drawing Sheets

(51) Int. Cl.
*B66C 13/08* (2006.01)
*F03D 13/25* (2016.01)
*F03D 13/10* (2016.01)

(58) Field of Classification Search
USPC .......................... 294/67.5, 86.12, 93, 81.61
See application file for complete search history.

(56) References Cited

U.S. PATENT DOCUMENTS

| | | | | |
|---|---|---|---|---|
| 8,016,519 | B2* | 9/2011 | Bingham | B66C 23/52 |
| | | | | 405/209 |
| 9,580,882 | B2* | 2/2017 | Mulderij | E02D 13/04 |
| 10,239,733 | B2 | 3/2019 | Belder et al. | |
| 2004/0115035 | A1* | 6/2004 | Tygard | B66C 1/427 |
| | | | | 414/621 |
| 2004/0189031 | A1* | 9/2004 | Zhu | B66C 1/663 |
| | | | | 294/81.1 |
| 2012/0263563 | A1* | 10/2012 | Tygard | B66F 9/183 |
| | | | | 414/619 |
| 2013/0307282 | A1* | 11/2013 | Belder | B66C 1/108 |
| | | | | 294/81.61 |
| 2015/0308069 | A1 | 10/2015 | Mulderij | |
| 2017/0369295 | A1* | 12/2017 | Tygard | B66C 1/44 |
| 2021/0253403 | A1* | 8/2021 | Van Vessem | B66C 1/54 |
| 2021/0301790 | A1* | 9/2021 | Rabaut | E04H 12/345 |

FOREIGN PATENT DOCUMENTS

| | | |
|---|---|---|
| WO | 2014084738 A1 | 6/2014 |
| WO | 2016184905 A1 | 11/2016 |

* cited by examiner

COUPLING TOOL FOR CONNECTION TO AN OUTER END OF A TUBULAR ELEMENT FOR UPENDING THE ELEMENT

CROSS-REFERENCE TO RELATED APPLICATIONS

This application is the United States national phase of International Application No. PCT/EP2019/069674 filed Jul. 22, 2019, and claims priority to Belgian Patent Application No. 2018/5540 filed Jul. 26, 2018, the disclosures of which are hereby incorporated by reference in their entirety.

BACKGROUND OF THE INVENTION

Field of the Invention

The invention relates to a coupling tool for connection to an outer end of a tubular element with a longitudinal direction for the purpose of upending the element. The invention likewise relates to a device and method for upending a tubular element at an outer end using the coupling tool. The invention relates particularly to a device and method for upending a foundation pile of a wind turbine to be placed on an underwater bottom and/or a wind turbine tower to be placed on an already installed foundation from a vessel at an outer end.

Description of Related Art

The invention will be elucidated with reference to an offshore wind turbine. This reference does not however imply that the invention is limited thereto, and the device and method can be applied equally well for placing any other tubular element on any ground surface. It is thus for instance possible to apply the invention in the context of arranging other offshore foundation structures, of jetties, radar and other towers, and also for onshore applications.

Foundation piles of an offshore wind turbine in many cases comprise hollow tubular elements of steel or concrete which can have lengths of more than 100 m, a diameter of 6 m and more, and a weight which can rise to 800-2300 tons and more. Foundations for wind turbines are moreover becoming increasingly heavier because wind turbines are constantly being scaled up. Because the foundations are becoming increasingly more sizeable, they are increasingly more difficult to handle. The foundation can here comprise a so-called monopile foundation or a jacket foundation.

A known method for placing a foundation pile on an underwater bottom comprises of taking up the foundation pile from a vessel with a lifting means such as a lifting crane and lowering the foundation pile onto or into the underwater bottom. The foundation pile is then uncoupled from the lifting means.

Taking up of a foundation pile is a delicate operation, among other reasons because the foundation pile can easily become damaged herein. It is important here to consider that the foundation pile may protrude over the deck of a vessel over a large distance, and that distances between a device for take-up and the foundation pile are generally very small relative to for instance the diameter of the foundation pile, so that undesired contact between a device for take-up and wall parts of the foundation pile can easily occur. Various operators are furthermore active in operation of the tools used, such as the lifting crane, winches provided on the deck of the vessel, and the like.

A drawback of the known device is that there is a high chance of damage to a tubular element to be upended, such as a foundation pile. The known device is also only able to perform its function when the sea is relatively calm, and is generally only suitable for a limited diameter range.

SUMMARY OF THE INVENTION

An object of the present invention is therefore to provide a coupling tool for connection to an outer end of a tubular element for the purpose of upending the element, and a device and method for upending a tubular element with a longitudinal direction at an outer end, which help to at least partially obviate the above stated prior art drawbacks. The invention particularly seeks to provide an improved device and method for upending a tubular element with a longitudinal direction, particularly a foundation pile of a wind turbine to be placed on an underwater bottom, at an outer end.

According to the invention, a coupling tool according to is provided for this purpose. The coupling tool comprises engaging means for engaging the outer end of the element and a pivotable lifting member with which the coupling tool can be suspended from a lifting means such as a crane, wherein mounted on the coupling tool are resilient arms which can be moved from a starting position to a position against a wall part of the outer end of the element for the purpose of aligning the suspended coupling tool relative to the outer end.

During use, the resilient arms forming part of the coupling tool are first to come into contact with the outer end to be upended, wherein the resilience ensures that the coupling tool, and more particularly the engaging means thereof, are aligned relative to the outer end. Because the resilient arms have been placed against the wall part of the outer end, they are able to move thereover and co-displace the coupling tool, particularly the engaging means, so that these means are aligned with the outer end. During use, the resilient arms make contact with the outer end of the element and damp the movement of the coupling tool relative to the outer end until the coupling tool is aligned with the outer end of the element. This likewise allows the engaging means to be positioned such that they are able to engage the outer end without much risk of unexpected movements, which could cause damage. The resilient force of the resilient arms acts in the direction of the wall part so that the resilient arms press against the wall part with a certain force. This force should not be too great so as to avoid damage by, and to, the resilient arms. The spring constant required for this purpose can be determined by the skilled person in simple manner.

A practical embodiment relates to a coupling tool wherein the arms can be arranged against an external wall part of the outer end of the element. In this embodiment outer ends of the resilient arms are situated at a certain distance from the external wall part when in their starting position, and this distance can be chosen within wide limits. This is because it is not dependent on for instance a diameter of the tubular element, which is the case when the arms can be arranged against internal wall part of the outer end of the element.

The resilient action of the arms can be realized in any manner. It is thus possible to make use of the elasticity of the material of which the arms are made. A suitable embodiment comprises a coupling tool wherein the arms are mounted pivotally on the coupling tool and can be rotated round the hinge using drive means. An embodiment wherein the drive means comprise hydraulic piston cylinders is preferred. By imparting a movement on the hydraulic piston cylinders the arms can rotate round their pivoting connection to the coupling tool. The hydraulic piston cylinders can also partially support the resilient action of the arms, and can ensure that movements of the suspended coupling tool are damped, particularly relative to the outer end of the element.

Another embodiment of the invention is aimed at a coupling tool wherein the arms are provided at a free outer end with rolling bodies which can be arranged against the wall part. The rolling bodies ensure that the outer ends of the arms can move over the wall part more easily and thus seek the correct aligned position.

A further improved embodiment comprises a coupling tool wherein the arms are provided at the free outer end with second rolling bodies which can be arranged against the wall part and which are arranged on resilient side arms of the arms.

The coupling tool can in principle be embodied in any manner known coupling tools can also be provided with the resilient arms of the invention. A synergistic embodiment relates to a coupling tool which comprises a cross-shaped support structure of mutually coupled beams, and engaging means, slidable along the beams from a clear position to a clamping position, in the form of clamping members for coupling to the wall part of the outer end of the tubular element in the clamping position, in which clamping position the beams extend substantially transversely of the longitudinal direction of the tubular element.

In the context of the present description of the invention the term "substantially" is understood to mean more than 80% of the indicated value or property, more preferably more than 85%, still more preferably more than 90%, and also 100%.

The coupling of the slidable clamping members to a wall part of the tubular element can in principle comprise any type of coupling. Suitable couplings for instance comprise a friction coupling or a flange coupling, or a combination of the two. A friction coupling is based on generating friction forces between surfaces of a clamping member and a relevant wall part on which the clamping member engages by pressing the two surfaces together. A flange coupling can be based on a bolt connection between flanges of a clamping member and a relevant wall part on which the clamping member engages. A better flange coupling can be obtained by embodying the clamping members such that they can slide under a flange of the tubular element so that a mechanical flange coupling results.

A suitable embodiment of the coupling tool comprises resilient arms which are mounted on a beam of the support structure.

The coupling tool, and more particularly the resilient arms and the slidable clamping members thereof, ensure that a tubular element can be taken up and upended, particularly from a rocking vessel, with less chance of damage. The invented device further allows a great variety in the dimensions, more particularly the diameter, of tubular elements to be upended.

In an embodiment of the invention the clamping members are slidable from the clear position to a clamping position, located further away from a centre of the cross of the support structure than the clear position, for coupling to an internal wall part of a hollow outer end of the tubular element. Providing the option of sliding the clamping members from the clear position to the clamping position enables tubular elements of varying diameters to be engaged and upended without the coupling tool having to be modified for this purpose. The coupling tool particularly enables tubular elements with relatively large diameters to be upended. In the context of the present application relatively large diameter is understood to mean a diameter greater than 6 m, more preferably greater than 7 m, still more preferably greater than 8 m, still more preferably greater than 9 m, and most preferably greater than 10 m.

An embodiment of the coupling tool according to the invention is characterized in that the clamping members are slidable from the clear position to a clamping position, located further away from a centre of the cross of the support structure than the clear position, for coupling to an internal wall part of a hollow outer end of the tubular element.

Yet another embodiment provides a coupling tool which further comprises support members, connected to the beam, for a wall part of the tubular element. Such members can be helpful in supporting a tubular element while it is being upended counter to the force of gravity. The support members are preferably applied for upending tubular elements with a relatively large diameter, and are instrumental in avoiding overload of the tubular element.

In an embodiment the support members are connected to the beam at adjustable fixed positions of the beam. Adjustable yet fixed positions can for instance be formed by pin-hole connections between the support members and the relevant beam of the support structure.

An improved embodiment of the invention relates to a coupling tool wherein the support members are configured to support an outer wall part of the tubular element.

Yet another embodiment of the invention relates to a coupling tool, this further comprising here a support structure differing from the support members and extending at least along a part of the periphery of the tubular element, for instance along half or a quarter of the periphery. The support structure is preferably connected to at least two beams of the cross-shaped support structure.

In another useful embodiment of the invention the coupling tool further comprises means for adjusting the angular position of the support structure relative to the lifting member which is pivotally coupled to the support structure. This makes it possible to adjust the angular position of the support structure. The support structure can here be moved from an insertion position, in which position the device can be coupled to a tubular structure, to a lifting position, in which the tubular element is in (partially) upended position and, finally, in a position in which it hangs vertically.

The angle adjusting means can be embodied in any known manner, wherein an embodiment in which the angle adjusting means comprise a hydraulic piston cylinder extending between the lifting member and the support structure is preferred.

The clamping members of the support structure can in principle be situated on an upper or lower side, or both sides of the support structure. A practical embodiment relates to a coupling tool wherein the lifting member is situated on an upper side of the cross-shaped support structure for connection to the lifting means, and the clamping members are slidable along a lower side of the support structure.

The clamping members of the support structure can in principle be slidable along the beams of the support structure in any manner known to the skilled person. A relatively low-maintenance embodiment relates to a coupling tool wherein the clamping members are slidable by means of hydraulic piston cylinders extending between a clamping member and the support structure.

According to an embodiment of the invention, the support structure is cross-shaped, which is understood to mean a structure comprising a number of arms extending from a centre. The number of arms can be chosen at random, although a cross-shaped support structure which is X-shaped and/or Y-shaped is preferred. Such a support structure has respectively 4 or 3 arms.

Because the coupling tool has for its object to at least partially prevent damage to tubular elements to be upended, another embodiment of the invention is formed by a coupling tool wherein surfaces which can come into contact with wall parts of the tubular element are provided with shock-absorbing elements such as rubber covering. These surfaces can for instance be end surfaces of the clamping members, of the support members, of the resilient arms and/or of the support structure in some embodiments.

Another aspect of the invention relates to a device for upending a tubular element at an outer end, comprising a lifting means carried by a carrier structure and a coupling tool taken up by the lifting member and provided with the resilient arms. The device is particularly suitable for upending tubular elements offshore, for which purpose the device comprises according to an embodiment a floating vessel as carrier structure. In this embodiment the device is manipulated from a work deck of a vessel, for instance a jack-up platform. The advantages of the invention are most clearly manifest when the carrier structure comprises a floating vessel suitable for lifting heavy objects.

Yet another aspect of the invention relates to a method for upending a tubular element with a longitudinal direction at an outer end. The method comprises the steps of:
  providing a device according to the invention;
  taking up the coupling tool by the lifting member using a lifting means;
  carrying the suspended coupling tool to an outer end of the tubular element;
  moving the resilient arms mounted on the coupling tool from a starting position to a position against a wall part of the outer end of the element for the purpose of aligning the suspended coupling tool relative to the outer end;
  coupling the coupling tool to the outer end in aligned position; and
  upending the tubular element coupled to the coupling tool, wherein the coupling tool pivots relative to the lifting member.

In an embodiment the coupling can comprise of sliding the clamping members along the beams from a clear position to a clamping position, with the purpose of coupling these members to a wall part of the outer end of the tubular element in the clamping position, in which clamping position the beams extend substantially transversely of the longitudinal direction of the tubular element.

An embodiment of the method can further also comprise of lifting the tubular element coupled to the device into a desired position; and in yet another embodiment of sliding the clamping members along the beams from the clamping position to the clear position in order to uncouple the device from the tubular element.

A peripheral part of the element is engaged by the clamping members with a suitable clamping tension during upending of the element. Because the clamping members are for instance situated relatively close to the centre of the cross-shaped support structure during insertion of the device into a hollow outer end of the tubular element, damage is less likely to be done. This also makes it possible, if desired, to work in a heavier swell than is possible with the prior art method.

The device is particularly suitable for upending tubular elements of a relatively large size, for instance with diameters of 6 m and more, and with lengths which can amount to 80 m and more. An embodiment provides for this purpose a device, this further comprising here a lifting means carried by a carrier structure for taking up the support structure by the lifting member. A suitable lifting means comprises a lifting crane of any known type. The support structure for the lifting means can comprise a ground surface, soil, a concrete plate and so on.

The advantages of the device according to the invention are most clearly manifest in an embodiment wherein the tubular element is a foundation pile of a wind turbine and/or a wind turbine tower to be placed on an already installed foundation.

In an embodiment of this method the coupling tool is actively pivoted relative to the lifting member using the angle adjusting means, particularly in order to move the coupling tool to an insertion position suitable for the position of a tubular element to be taken up.

Another aspect of the invention relates to an assembly of a device according to any one of the described embodiments and a tubular element coupled to such a device.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be further elucidated on the basis of the following figures, without otherwise being limited thereto. In the figures.

DESCRIPTION OF THE INVENTION

Figure 1:
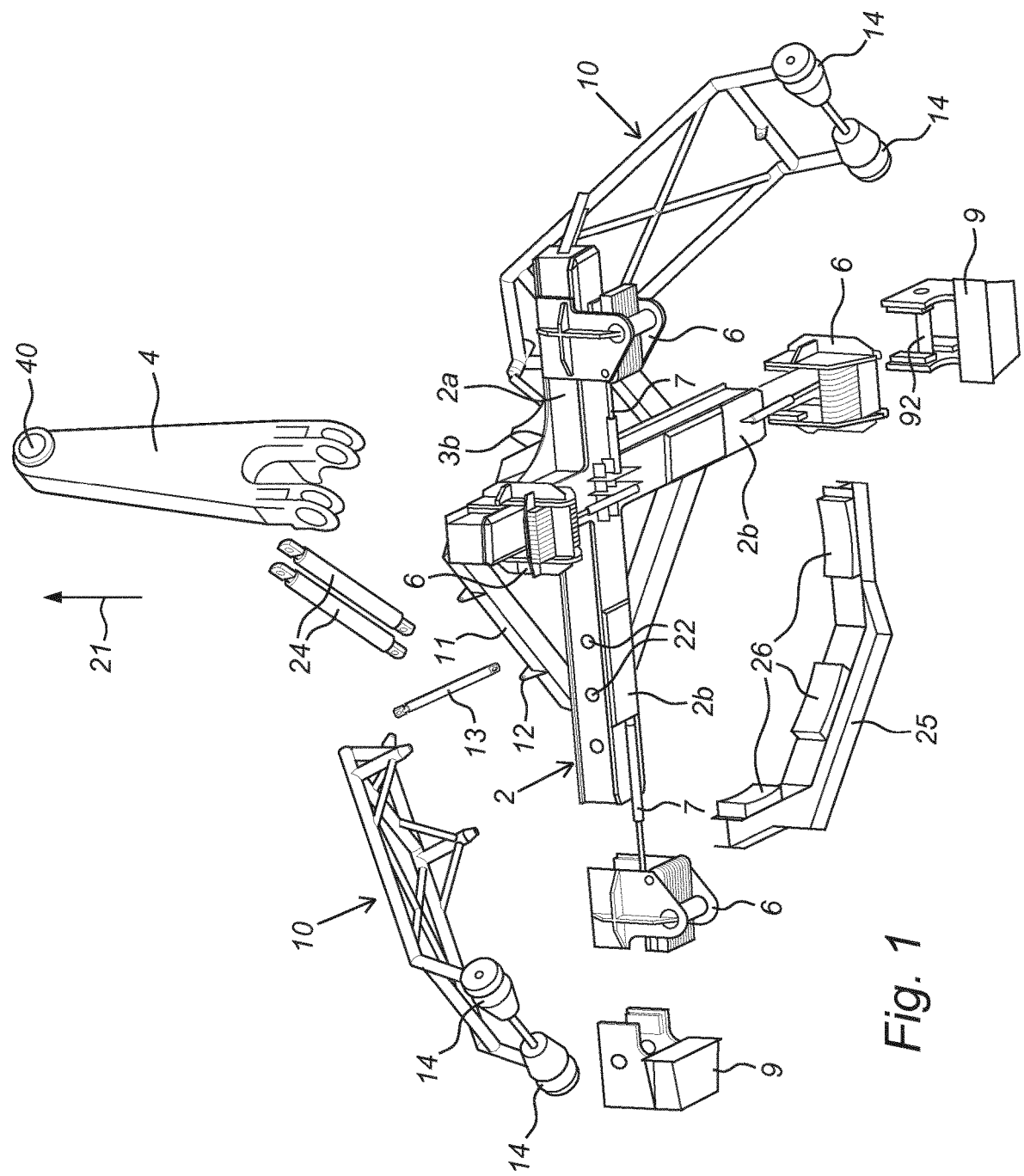
FIG. 1 is a schematic perspective exploded view of the device according to an embodiment of the invention.

Referring to the figures, a coupling tool 1 for upending a foundation pile 20 with a longitudinal direction 21 at an outer end is shown. Coupling tool 1 is likewise suitable for upending and placing other elements with a longitudinal direction, such as for instance transition pieces of a wind turbine mast, optionally on each other or on another surface. In the shown embodiment coupling tool 1 comprises a cross-shaped support structure in the form of mutually coupled beams (2a, 2b). The support structure can however also comprise a plurality of beams, for instance three beams which form the legs of a Y-shaped support structure. The coupling can for instance be brought about by means of welding of beam parts. The beams for instance have a tubular cross-section, although H-beams or I-beams are also possible. In the centre of the cross the support structure is provided with two hinged plates (3a, 3b) in which a lifting member 4 is connected pivotally to support structure 2 by means of a pin-hole connection. Lifting member 4 is provided on a lifting side with a lifting eye 40 for connection to a lifting means such as a crane (not shown), this with interposing of hoisting cables which are each connected to lifting eye 40. The function of lifting eye 40 can also take a different form, for instance that of shaft stub or trunnion. With lifting member 4 coupling tool 1 can be suspended from a lifting means in a manner such that support structure 2 can rotate in relatively unhindered manner round a rotation axis 5 running perpendicularly of the hinged plates (3a, 3b).

Figure 5:
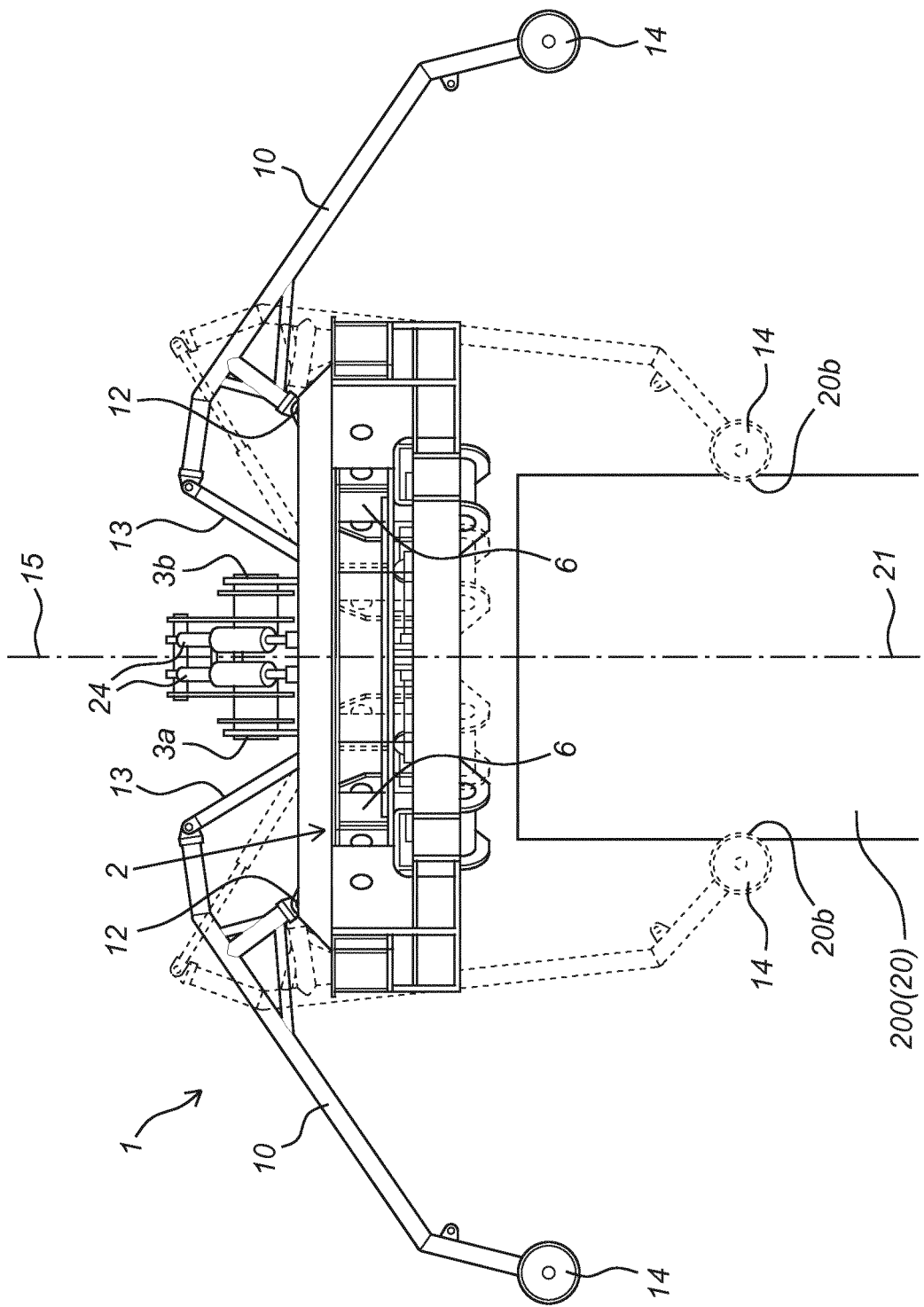
FIG. 5 is a schematic front view of the embodiment of the device according to the invention shown in FIG. 1.

According to the invention, coupling tool 1 is provided with resilient arms 10 which are mounted on two positions, which are opposing relative to the centre of the cross, on transverse beams 11 arranged between two beams (2a, 2b). The connection to transverse beams 11 runs via hinges 12, as shown in FIG. 5. Also according to FIG. 5, the arms can be moved from a shown starting position to a position against a wall part 20b of the outer end 200 of tubular element 20 for the purpose of aligning the suspended coupling tool 1 relative to outer end 200. Arms 10 here take on the position shown with broken lines. In the shown embodiment rotation of arms 10 relative to support structure 2 is done by imparting a movement on hydraulic cylinders 13 arranged between arms 10 and support structure 2. The resilient arms 10 forming part of coupling tool 1 here have a sufficiently great length to be able to be first to come into contact with the outer end 200 of the element to be upended.

Arms 10 are provided at a free outer end with rolling bodies 14 which come into contact with wall part 10b during use. Rolling bodies 14 ensure that the outer ends of arms 10 can move more easily over wall part 20b in the longitudinal direction 21 in order to thus seek the correct aligned position. Rolling bodies 14 can rotate in their rotation direction round a shaft connection 140.

The resilient force with which resilient arms 10 with rolling bodies 14 are held against wall part 20b is determined by the pressure in hydraulic cylinders 13. Hydraulic cylinders 13 do provide a certain counter-pressure when arms 10 are held against wall part 10b. This counter-pressure should not be too high so as to avoid damage by, and to, resilient arms 10.

Figure 2:
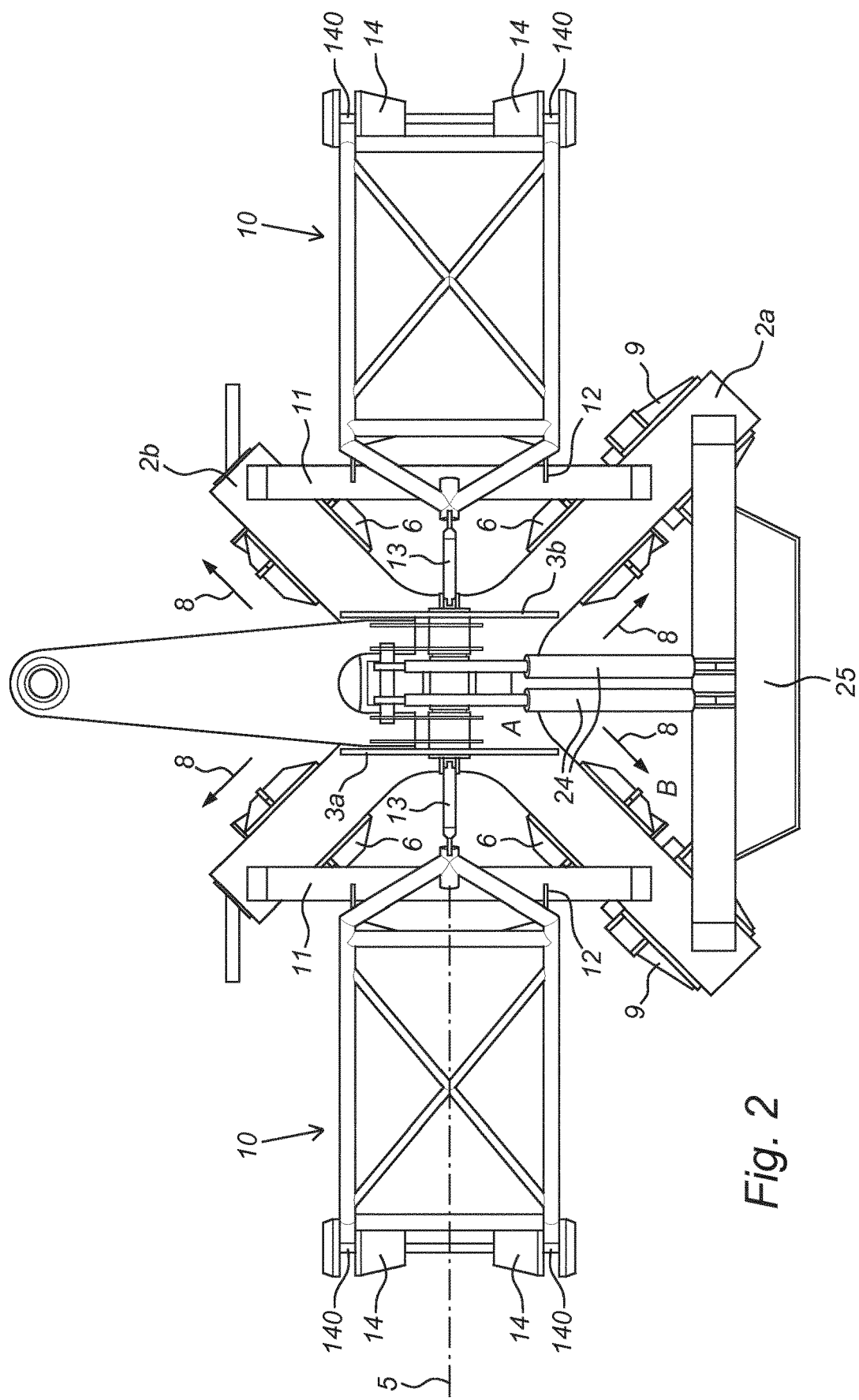
FIG. 2 is a schematic top view in assembled state of the embodiment shown in FIG. 1.
Figure 3:
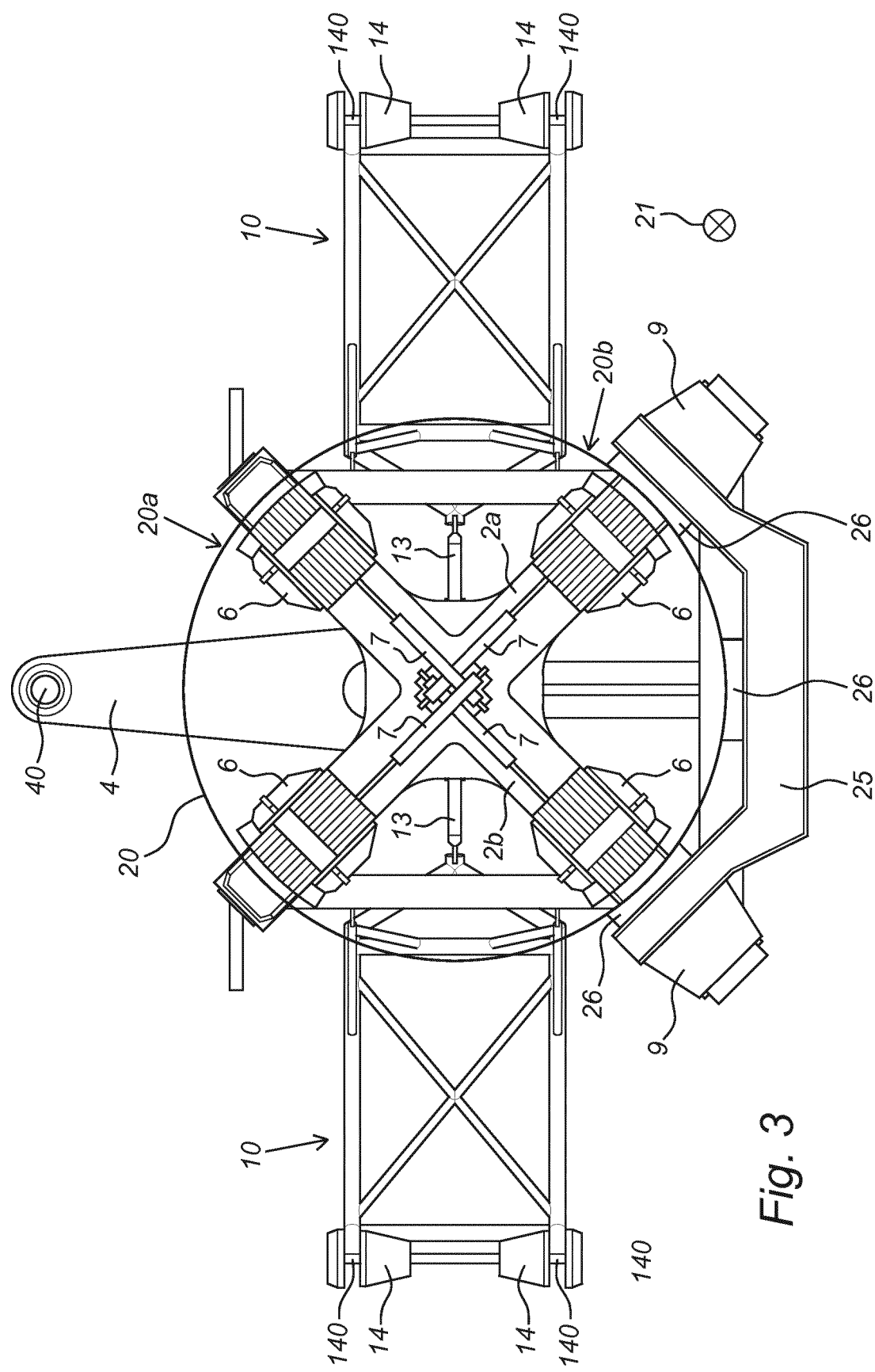
FIG. 3 is a schematic top view of the embodiment of the device according to the invention shown in FIG. 1 with a tubular element coupled thereto.

Coupling tool 1 further comprises clamping members 6 slidable along the beams (2a, 2b) from a clear position to a clamping position. Each camping member 6 has a U-shaped cross-section and can in this way at least partially enclose a beam (2a, 2b) so that clamping member 6 is able to slide with sliding surfaces over the relevant beam (2a, 2b) without losing contact with the beam (2a, 2b). In the shown embodiment clamping members 6 are slidable along a lower side of support structure 2. The lower side of support structure 2 is defined here as the side where lifting member 4 is not situated. This lifting member 4 is situated on an upper side of the cross-shaped support structure 2. Clamping members 6 can be slid over the beams (2a, 2b) by means of hydraulic piston cylinders 7 extending between a relevant clamping member 6 and a beam of support structure 2. By imparting on the cylinders a radially outward movement in the indicated directions 8 as according to FIG. 2 the clamping members 6 are moved from a clear position A lying radially relatively close to the centre of the cross to a clamping position B located further away from the centre of the cross of the support structure. As shown in FIG. 3, in the clamping position B clamping members 6 lie under pressure against internal wall parts 20a of a hollow outer end of foundation pile 20, wherein a clamping member part is slid under a flange or protruding edge (not shown) of the foundation pile. This results in a mechanical coupling, optionally combined with a friction coupling between end surfaces of clamping members 6 and the internal wall parts 20a of foundation pile 2. In order to further improve this coupling the end surfaces of clamping members 6 which come into contact with wall parts 20a can be provided with shock-absorbing elements such as rubber covering. The figures further show that in the clamping position of clamping members 6 the beams (2a, 2b) extend substantially transversely of a longitudinal direction 21 of foundation pile 20. In FIG. 3 the longitudinal direction 21 runs perpendicularly of the plane of the figure.

Coupling tool 1 is further provided with support members 9 connected to a beam (2a, 2b). Support members 9 are configured to support outer wall parts 20b of foundation pile 20, at least along parts of the periphery of foundation pile 20. Support members 9 likewise have a U-shaped cross-section and can be slid over end parts of the beams (2a, 2b) to an adjustable fixed position of the relevant beam (2a, 2b). The adjustable fixed positions are for instance determined by a number of openings 22 which are arranged in a side wall of a beam (2a, 2b) and in which a corresponding pin 92 of a support member 9 can be arranged in order to secure this member to the beam (2a, 2b). Because support members 9 are configured to support an outer wall part 20b of foundation pile 20 during upending, support members 9 will generally be situated more radially outward in the radial direction 8 than clamping members 6, which are after all configured in the shown embodiment to clamp an inner wall part 20a of foundation pile 20 during upending.

For foundation piles 20 with relatively large diameters, for instance of 6 m and more, and/or a relatively high weight, for instance 800-2300 tons and more, it may be useful to provide further support in the form of a support structure 25, which differs from support members 9 and extends along at least a part of the periphery of foundation pile 20. In order to obtain sufficient strength it may be useful to connect support structure 25 to at least two beams (2a, 2b), as shown in FIGS. 2 and 3. The surfaces of support structure which can come into contact with wall parts of foundation pile 20 can also be provided with shock-absorbing elements 26, for instance in the form of rubber covering.

During use, when foundation pile 20 is being upended, both support members 9 and support structure 25 are situated on a lower side of foundation pile 20 in partially upended position. Support members 9 and, if desired, support structure 25, are therefore particularly useful in absorbing the own weight of foundation pile 20.

Figure 4:
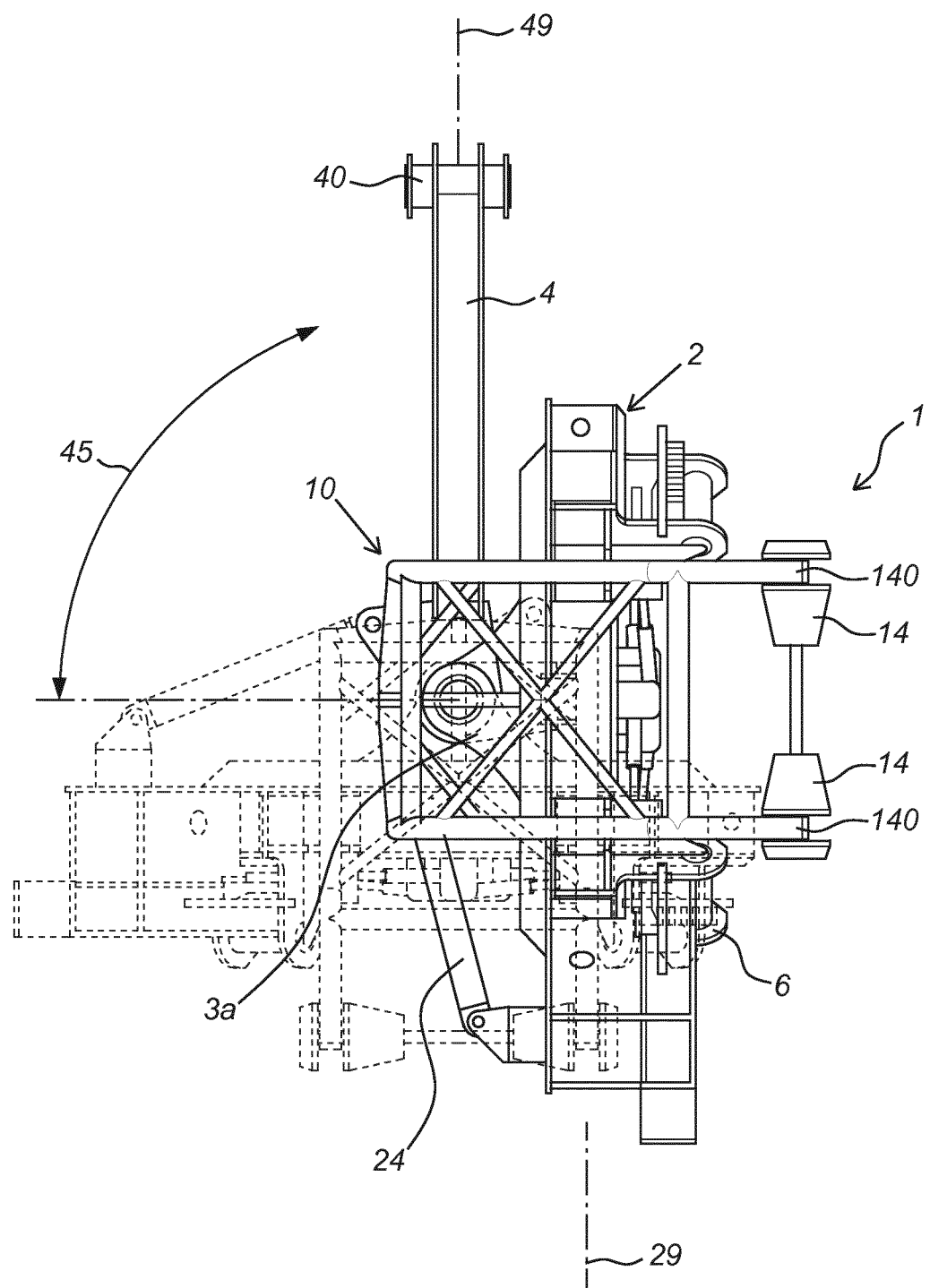
FIG. 4 is a schematic side view of the embodiment of the device according to the invention shown in FIG. 1 in two angular positions.

Finally, coupling tool 1 can also be provided with means for adjusting the angular position of support structure 2 relative to the lifting member 4 which is connected pivotally to support structure 2. In the shown embodiment the angle adjusting means comprise hydraulic piston cylinders 24 extending between lifting member 4 and support structure 2. In the extended position of cylinders 24, shown in FIG. 4, the plane 29 of support structure 2 runs substantially parallel to the plane 49 of lifting member 4. In this lifting position the angle 45 between the two planes of lifting member 4 and support structure 2 amounts to substantially 0 degrees. By retracting cylinders 24 the support structure 2 is rotated round rotation axis (see FIG. 2) from the insertion position shown in FIG. 4 to the hanging position shown with broken lines in the same figure. Plane 29 of support structure 2 runs here substantially perpendicular to the plane of lifting member 4. The angle 45 between lifting member 4 and support structure 2 has here increased to about 90 degrees.

During use the invented coupling tool 1 is firstly connected to a hoisting cable (not shown) of a crane (not shown) by connecting the hoisting cable to the eye 40 or alternative connecting means of lifting member 4. Support structure 2 is then taken up by lifting member 4 using the crane and carried to an outer end of foundation pile 20. Foundation piles 20 which have to be upended and for instance have to be arranged in a seabed are generally situated on the work deck of a vessel, for instance a jack-up platform, in horizontal position. In order to lift such a horizontally oriented foundation pile 20 with coupling tool 1 the support structure 2 of the device is moved into the insertion position shown with full lines in FIG. 4, and inserted into a hollow outer end of foundation pile 20, by imparting a movement on cylinders 24. Clamping members 6 are here in the clear position A, i.e. relatively close to the centre of the cross.

According to the invention, insertion of coupling tool 1 takes place using the resilient arms 10. The resilient arms 10 forming part of coupling tool 1 are moved from the rest position shown in FIG. 5 to a position lying closer to the wall part 20*b* to be touched. In this situation the coupling tool 1 swings to some extent because it is suspended from the crane. After arms 10 have approached wall part 20*b* sufficiently, arms 10 are first to come into contact with the outer end 200 to be upended, wherein the resilience ensures that coupling tool 1, and more particularly the support structure 2 provided with the coupling means 6, is aligned relative to outer end 200. Because resilient arms 10 have been placed against wall part 20*b* of outer end 200, they are able to move thereover by rotation of rolling bodies 14. Coupling tool 1, particularly support structure 2, is co-displaced in this movement so that it is aligned with outer end 200. The axis 15 running perpendicularly of the plane 29 of the support structure hereby comes to lie substantially parallel to the longitudinal direction 21 of the element to be upended. This alignment allows coupling means 6 to be positioned such that they are able to engage outer end 200 without much risk of unexpected movements which could cause damage to the element, particularly to foundation pile 20.

Clamping members 6 are then slid along the beams (2*a*, 2*b*) from their clear position A to their clamping position B, wherein a coupling with the internal wall parts 20*a* of the hollow outer end of foundation pile 2 is realized. In this clamping position the beams (2*a*, 2*b*) extend substantially transversely of the longitudinal direction of foundation pile 20. The foundation pile 20 coupled to device 1 is then upended by hoisting the whole with the crane. Support structure 2 here pivots relative to lifting member 4 until angle 45 has been reduced to 90 degrees, in other words until plane 29 of support structure 2 runs substantially perpendicular to plane 49 of lifting member 4. In this position the foundation pile 20 coupled to device 1 is hoisted with the crane into a desired position, for instance there where foundation pile 20 has to be lowered onto the seabed. In the desired position clamping members 6 are then slid radially inward along the beams (2*a*, 2*b*) from clamping position B to clear position A in order to uncouple device 1 from foundation pile 20. During upending of foundation pile 20 it can if desired be supported further by support members 9 and/or support structure 25.

It will be apparent that the above described embodiments have to be provided with peripheral equipment, such as for instance hydraulic and electric power sources, supply conduits therefor, and the like. This peripheral equipment is not described in further detail.

With the embodiment of the invented device, described above in detail, a tubular object, particularly a foundation pile of a wind turbine, can be placed from a floating vessel onto a ground surface, particularly an underwater bottom, this in worse weather conditions than is possible with the known method. This reduces the risk of damage to the tubular object. The device also makes it possible to manipulate tubular elements with relatively large dimensions, wherein different dimensions can be accommodated.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A coupling tool for connection to an outer end of a tubular element for the purpose of upending the element, wherein the coupling tool comprises engaging means configured to engage internal wall parts of a hollow outer end of the tubular element and a pivotable lifting member with which the coupling tool can be suspended from a lifting means, wherein mounted on the coupling tool are resilient arms configured to be moved from a starting position to a position against a wall part of the outer end of the tubular element for the purpose of aligning the suspended coupling tool relative to the outer end, wherein the resilient arms are mounted pivotally by means of a hinge on the coupling tool and each arm can be rotated around the hinge using a drive means.

2. The coupling tool according to claim 1, wherein the drive means comprises hydraulic piston cylinders.

3. The coupling tool according to claim 2, wherein the resilient arms are provided at a free outer end with first rolling bodies which can be arranged against the wall part.

4. The coupling tool according to claim 2, wherein the coupling tool comprises a support structure of beams and clamping members, slidable along the beams from a clear position to a clamping position, for coupling to the wall part of the tubular element in the clamping position, in which clamping position the beams extend substantially transversely of a longitudinal direction of the tubular element.

5. The coupling tool according to claim 1, wherein the resilient arms are provided at a free outer end with first rolling bodies which can be arranged against the wall part.

6. The coupling tool according to claim 5, wherein the resilient arms are provided at the free outer end with second rolling bodies which can be arranged against the wall part and which are arranged on resilient side arms of the resilient arms.

7. The coupling tool according to claim 5, wherein the coupling tool comprises a support structure of beams and clamping members, slidable along the beams from a clear position to a clamping position, for coupling to the wall part of the tubular element in the clamping position, in which clamping position the beams extend substantially transversely of a longitudinal direction of the tubular element.

8. The coupling tool according to claim 1, wherein the coupling tool comprises a support structure of beams and clamping members, slidable along the beams from a clear position to a clamping position, for coupling to the wall part of the tubular element in the clamping position, in which clamping position the beams extend substantially transversely of a longitudinal direction of the tubular element.

9. The coupling tool according to claim 8, wherein the clamping members are slidable from the clear position to a clamping position, located further away from a centre of the support structure than the clear position, for coupling to an internal wall part of a hollow outer end of the tubular element.

10. The coupling tool according to claim 8, wherein the resilient arms are mounted on a beam of the support structure.

11. The coupling tool according to claim 8, wherein the coupling tool further comprises means for adjusting the angular position of the support structure relative to the lifting member which is pivotally coupled to the support structure.

12. The coupling tool according to claim 1, wherein end surfaces of the engaging means and/or the resilient arms which can come into contact with the internal and/or external wall parts of the tubular element, respectively, are provided with shock-absorbing elements.

13. The coupling tool according to claim 12, wherein the shock absorbing element comprises a rubber covering.

14. A device for upending a tubular element at an outer end, the device comprising a coupling tool according to claim 1 and a lifting means as defined in claim 1 carried by a carrier structure to take up the coupling tool using the lifting member.

15. The device according to claim 14, wherein the carrier structure comprises a floating vessel.

16. The device according to claim 14, wherein the tubular element is a foundation pile of a wind turbine.

17. A method for upending a tubular element with a longitudinal direction at an outer end, wherein the method comprises the steps of:
providing a device according to claim 14;
taking up the coupling tool by the lifting member using a lifting means;
carrying the suspended coupling tool to an outer end of the tubular element;
moving the resilient arms mounted on the coupling tool from a starting position to a position against a wall part of the outer end of the element for the purpose of aligning the suspended coupling tool relative to the outer end;
coupling the coupling tool to the outer end; and
upending the tubular element coupled to the coupling tool, wherein the coupling tool pivots relative to the lifting member.

18. The method according to claim 17, wherein the coupling tool is pivoted relative to the lifting member using the angle adjusting means.

19. An assembly of a device according to claim 14 having a tubular element coupled to the device.

20. The coupling tool according to claim 1, wherein the lifting means comprises a crane.

* * * * *